United States Patent [19]

Heuer et al.

[11] 4,144,563
[45] Mar. 13, 1979

[54] MICROPROCESSOR SYSTEM

[75] Inventors: Dale A. Heuer; Phillip C. Schloss; Larry L. Schroeder, all of Rochester, Minn.

[73] Assignee: International Business Machines Corporation, Armonk, N.Y.

[21] Appl. No.: 853,784

[22] Filed: Nov. 21, 1977

Related U.S. Application Data

[62] Division of Ser. No. 682,803, May 3, 1976.

[51] Int. Cl.² ............................................. G06F 1/00
[52] U.S. Cl. ................................................... 364/200
[58] Field of Search ...................................... 307/216; 364/200 MS File, 900 MS File

[56] References Cited

U.S. PATENT DOCUMENTS

| | | | |
|---|---|---|---|
| 3,995,222 | 11/1976 | Mitarai | 307/216 |
| 4,021,655 | 5/1977 | Healey et al. | 364/200 |
| 4,063,221 | 12/1977 | Watson et al. | 364/900 |
| 4,079,451 | 3/1978 | Woods et al. | 364/200 |

Primary Examiner—Raulfe B. Zache
Attorney, Agent, or Firm—Robert W. Lahtinen

[57] ABSTRACT

A single chip large scale integration processor processes its own on-chip control storage array while including the ability to also address supplemental off-chip control storage and to use such off-chip supplemental storage in substitution for portions of the on-chip storage. The processor further includes simplified arithmetic and logic (ALU) circuitry wherein the adder circuit has portions selectively gated to perform other functions with a reduced logic circuit requirement. Processor function is also enhanced by providing a read only storage (ROS) array in association with the ALU to provide multiple register loading and control functions in response to certain addresses. The processor also includes memory control circuitry that permits a group of like processors to access a single, external memory on a dynamic, prioritized basis.

10 Claims, 17 Drawing Figures

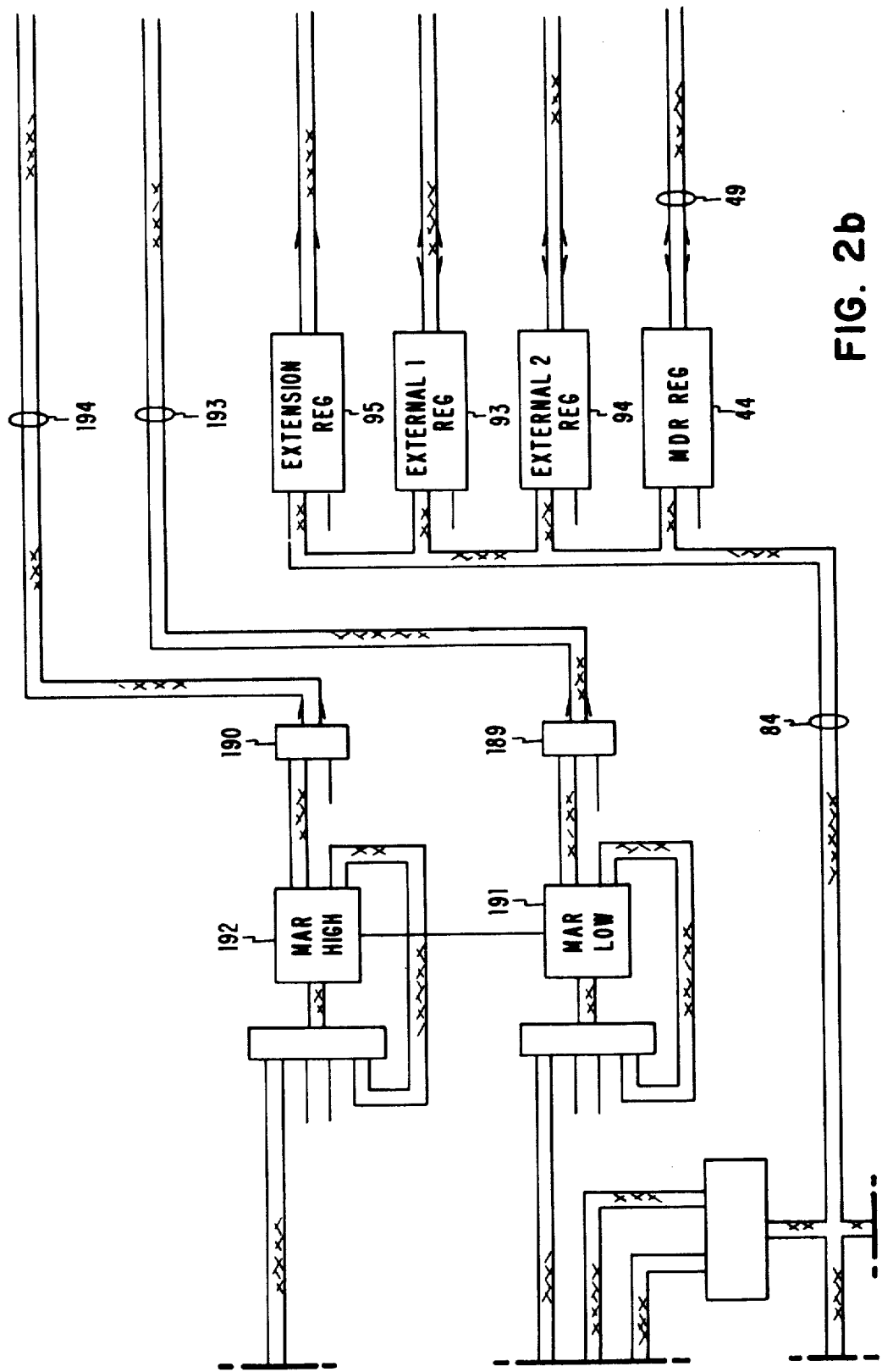

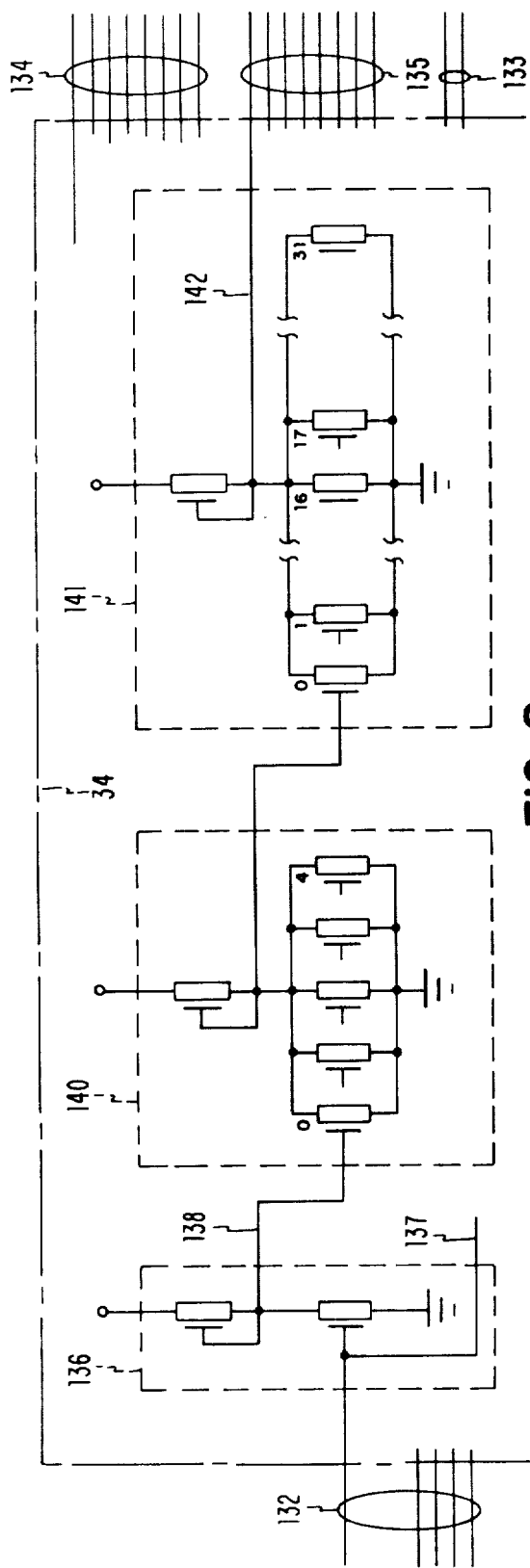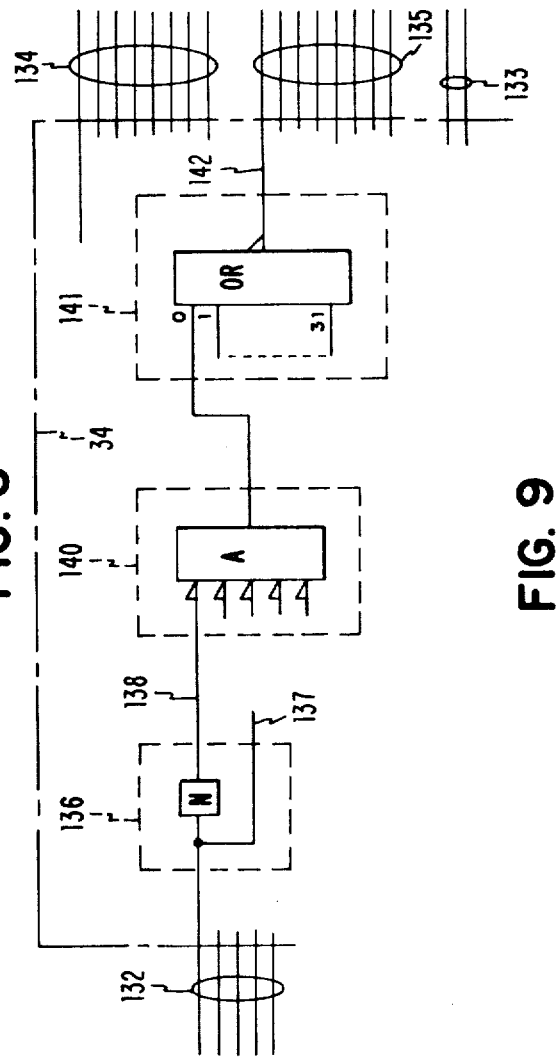
FIG. 8
FIG. 9

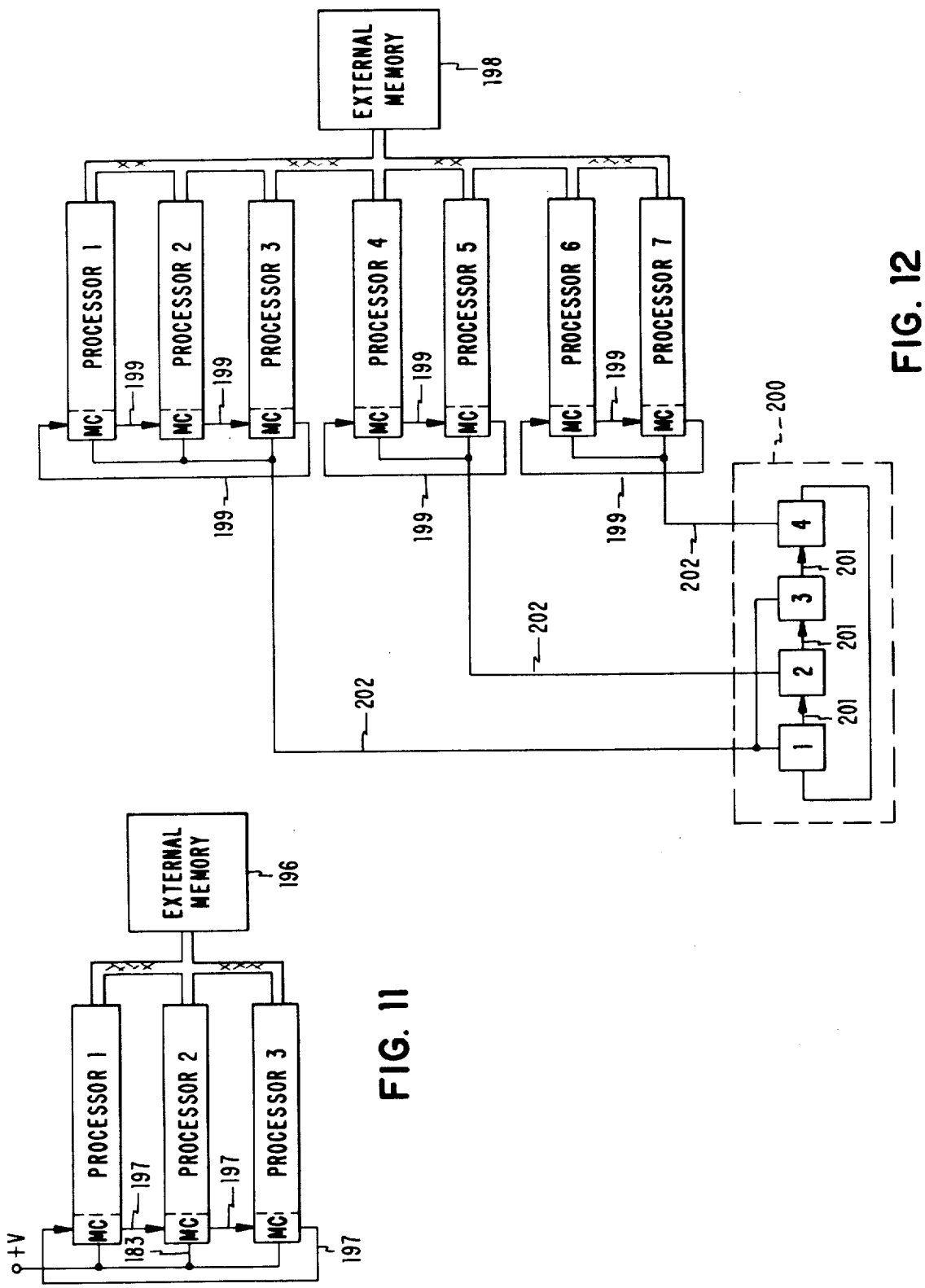

MICROPROCESSOR SYSTEM

This is a division of copending application Ser. No. 682,803, filed May 3, 1976, by Dale A. Heuer, Phillip C. Schloss and Larry L. Schroeder and assigned to assignee hereof.

BACKGROUND OF THE INVENTION

This invention relates to an electronic data processing system.

In various data processing environments it is desirable to have microprocessor control. In many environments the number and variety of demands that are made upon the controller or processor are such that it would be advantageous to use a plurality of processors doing parallel processing if such could be accomplished on an economically feasible basis. This is accomplished using a microprocessor which is a complete stand-alone unit on a single large scale integration circuit chip including on-chip clocking, local scratch pad storage, logical functions, memory control and a control storage array. The device is also capable of utilizing supplemental control storage and acting in concert with other similar processors to access a common external bulk storage in a parallel processing mode of operation.

SUMMARY OF THE INVENTION

The present invention is directed to a microprocessor which is adapted to be included on a single large scale integration circuit chip. This processor includes on such a single chip device not only the enabling circuitry of the processor, but also a read only storage control store array so that the chip requires only a source of oscillator pulses and a power on reset to function as an independent unit. The processor is designed to function with an external bulk memory storage making it adaptable to parallel processing environments. In addition, the processor is capable of accessing supplemental off-chip control storage in addition to the on-chip array and includes various modifications which permit economy of circuits and provide attributes of a wide word processor in a narrow word processing device.

The processor as shown is fundamentally a 12 bit device in that a 12 bit instruction is utilized which contains a four bit portion which defines the type and length and an eight bit portion which may contain modifiers, immediate data or addresses. The data bus is 8 bits wide and interchanges of data with the external bulk memory are 8 bit bytes. In addressing the supplemental, off-chip control storage data paths are used which are separate from those interconnecting the processor with the external bulk memory. By using a pair of parallel 8 bit data paths to the off-chip control storage it is possible to exchange a two byte data word to increase the effectiveness of the interchange of information with the control store.

In using both on-chip and off-chip control storage, it can be anticipated that access to off-chip storage will be slower and it is also possible to encounter other storage access time differentials. To overcome this problem in a manner that does not penalize the system by always accommodating a worst case time delay, the system clock is inhibited upon the generation of an access request and started again upon completion of the access cycle to make the system independent of the speed of the particular storage device used. In addition, circuitry is provided to effectively alter the on-chip control storage by selectively substituting off-chip supplementary control storage for single instructions or blocks of instructions to avoid the necessity of redesigning and replacing the entire processor chip in order to effect an alteration in the control storage array.

The circuitry which performs the processor arithmetic and logic functions is simplified and reduced in quantity by selectively gating the fundamental bit position adder circuits to effect numerous other functions upon command. An operation is decoded to variously energize a series of six gate lines which selectively modify the adder circuits to produce other functions as desired. Also in short word microprocessors, arithmetic and logic unit control bits become progressively less available. In the processor of the present invention, a register is assigned to retain such information which allows the device to proceed and change the ALU function, as reflected by the content of such register, only when required. At other times it is only necessary to alter the input data. The processor is further provided with a mini-mask or storage array which in response to a five bit address selects one of thirty-two array locations which concurrently loads an ALU input register, loads the ALU operation register and provides two bits of control information to the clocking and control circuitry. This effectively compresses in excess of two normal instructions into a single instruction to effect a saving in both microcode and execution time. This procedure gives a wide word instruction capability to a narrow word processor in selected situations.

The processor further possesses memory control circuitry for controlling access to the external bulk memory that includes as a part thereof a circuit that functions as one position of a continuously recirculating shift register. In addition, a multilevel line is included to permit selective disabling of the memory control circuit. The above shift register bit position may be interconnected to a series of like circuits of either other processors or other devices which access memory to form a free running ring counter. When the processor has a need to access the external bulk memory, such access is enabled upon receipt of the single bit in the ring counter and retention thereof by its bit position circuit. Using this technique a plurality of processors may access a single external bulk storage over a single data bus on a dynamic basis. Although this technique enables any number of processors or other devices to access the memory on a dynamic basis, it does not accommodate the fact that in most parallel processing systems there are one or more devices that require more frequent or priority access to the memory. This function is effected using the multilevel lines to selectively inhibit the ability to access memory. The processor shift register bit positions are connected in a plurality of rings and the multilevel lines of each ring are interconnected and connected to a bit position of a second level free running ring counter. Any ring of processor bit positions may be given more frequent access to memory by providing connection to more than a single second level ring counter bit position.

BRIEF DESCRIPTION OF THE DRAWINGS

FIGS. 2, 2a, 2b, 2c and 2d in combination illustrate the data flow architecture of the single chip processor of the invention.

FIGS. 8 and 9 illustrate the logic of the read only storage device used to provide multiple instruction functions from a single instruction in selected instances.

FIGS. 11 and 12 schematically illustrate the use of the memory control circuitry to effect a dynamic and prioritized accessing of a single external memory by multiple processors.

DETAILED DESCRIPTION

Figure 1:
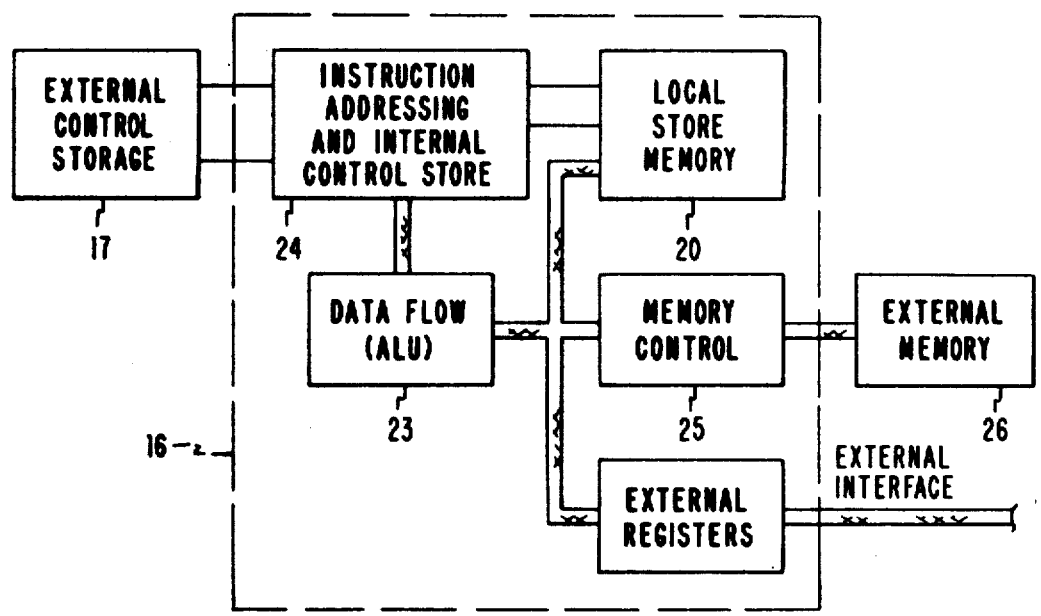
FIG. 1 is a schematic block diagram of the processing system of the present invention including the external control storage and external bulk memory.

As shown schematically in FIG. 1, the dash line 16 defines the boundary of the processor included on a single large scale integration chip. This is a true single chip microprocessor including its own control store array. Although the circuitry on the single chip may function as a unit, the processor includes the capability of addressing supplemental off-chip control storage 17 in addition to the on-chip control store array included in block 24.

The processor is an eight bit byte, single address microcontroller which may be contained on a single large scale integration circuit chip. The processor architecture includes a read only control store contained in block 24, a read/write scratch pad memory 20, an eight bit arithmetic and logic unit (ALU) 22 included in block 23, a single multiple byte transfer memory control 25, and 24 lines of external read/write memory address all available on the single large scale integration chip. The function is centered about an external read/write memory 26, but the chip can operate as a functional unit.

The processor's microinstructions are stored in the control store. The control store can be on-chip as shown, off-chip, or a combination of on-chip and off-chip control store and such control store can be read only or read/write. The use of off-chip control store will somewhat degrade the cycle performance of the processor. A read/write control store can be loaded by the processor from the external read/write memory.

The microinstructions are addressed by a pair of incrementable instruction address registers (IAR) 28 and 29. The IAR's 28 and 29 can be loaded from the control store output or from the local store memory (LSM) 30 to perform program branches and returns. The return address is saved in a specified address in the LSM. The branch address can be from either a current microprogram instruction immediate field or from a specified address in the local store memory.

The short microinstruction offers flexibility, good bit utilization and a design which eliminates much of the sequential clocking. Since most of the instructions are simple data moves, the gating can be done by the instruction itself.

LSM 30 is an on-chip scratch pad memory. It is grouped into even-odd register pairs to allow a two byte address gating to the external read/write memory or memory address register (MAR). The LSM operates like a single byte memory to the internal control circuitry. The local store address register (LSA) is an incrementable register which holds the address of the LSM bytes to be gated in or out. On a branch and link instruction, the instruction address register (IAR) is saved in the LSM at the LSA address as a two byte address.

The ALU 22 performs add, basic logic functions, register transfers, complements, rotate, carry in and combinations thereof. It is capable of doing 1's or 2's complement arithmetic. Branch on condition mask operations are generated on the output of the ALU allowing tests for 0's, 1's, mixed, carry and not carry. The branch can also test for three external line conditions. The ALU further may be used to gate in previously generated carries and carry ins from the carry save circuit 27.

The desired ALU operation is held in the ALU operation (AOP) register 32. This eight bit register eliminates the need for an ALU operation specification in all instructions. ALU 22 statically performs the operation that is latched until the AOP register 32 is reloaded.

A mini-mask 34 can be used in conjunction with the ALU operation. This mini-mask 34 consists of 32 words each having an 18 bit width. When a load mini-mask operation is requested, eight of the bits replace what is currently held in the AOP register, eight of the bits replace what is currently held in the B side of the ALU, and two bits are used for a skip instruction control. The new AOP operation held in the mini-mask 34 cannot be another load mini-mask operation.

The two extra bits allow an extra increment to the IAR in the event the result of the ALU operation was 1, 0's or not 0's. This capability is tested under program control and is automatic when the bits are used and a modify memory instruction is in operation. This capability could be used in a dual loop type subroutine where an LSM location is being decremented by one until it reaches zero thus finishing the subroutine and branching forward to a new part of the microinstructions. These two bits will only cause one extra increment to the IAR, that is when the condition is met one instruction is skipped.

The processor has an external memory operation register 36. This register controls what type of external memory activity will occur. The memory controls available are multiple memory transfers including local store memory to external memory, external memory to local store memory, external to control store, I/O to external, and external to I/O. Inclusive with this control is what is referred to as a memory priority bit. This bit is utilized to enable the processor to have access to an external memory. The priority bit enters the processor on the select in line 37 and is allowed to exit on the select out line 38. The processor that has the memory priority bit can hold the bit until the current memory access is complete.

In a single or multiple byte transfer to or from the local store memory (LSM) to the external memory, the number of bytes to be transferred is held in the count registers 41 and 42. If this count is left at zero the memory control will transfer one byte. In a memory transfer the memory priority bit is released to the select out line either after each byte or when count reaches zero. In a memory transfer and hold, the bytes are still transferred, as above, but the memory priority bit is not released until another memory control is loaded to release the bit. During either of these transfers, the processor cannot perform other instructions until the memory transfer is complete.

In any I/O memory transfer, the I/O device transfers data to the bulk memory at the I/O's speed and the memory priority bit is held until the count specified has been transferred. Again, the transfer and wait bit can be on allowing other memory transfers. During an I/O memory transfer the processor can continue to do other instructions, but it cannot issue any indirect or external memory operations.

All memory transfers are handled through the memory data register (MDR) 44. This is the only register that is interfaced to the external read/write memory. A memory address register extension is also available for memory addressability expansion. With this register the processor can directly address up to eight megabytes of external read/write memory.

The last memory control is a control store load. If an external read/write control store is used, control store instructions will have to be loaded. The instructions stored in this control store are loaded from an external read/write memory.

In a control store load, the external memory address has been set, the return address is saved and the location in control store where the information is to be loaded is available. Assuming the number of bytes to be transferred (loaded) is set, the processor transfers the number of bytes initiated and transfers control to the address that was saved.

The processor requires an oscillator (line 46) and a power on reset (line 47). After the power on reset, the function of the external I/O lines is completely under the control of the microinstructions. The microinstructions will be executed from the internal control store until bit zero or the high order bit of the pair of instruction address registers 28 and 29 is turned on. The occurrence of this condition indicates that the microinstructions must come from an external source.

The processor can act independently or it can be connected to an external read/write memory. All of these external memory data transfers are handled through the eight bit memory data register (MDR) 44 on input/output lines 49. These lines 49 are bidirectional.

The external memory is addressed directly by 23 memory address lines. Eight of the address lines are page or memory group addresses. These eight lines can only be loaded. The other 15 address lines are loadable from local store memory 30 and are automatically incremented after each memory access. As soon as the presently addressed byte is handled the address is automatically incremented. In a transfer between LSM 30 and external memory 26 or LSM 30 and I/O, the local store address register 51 and the count register are also automatically incremented.

Two eight bit registers are externally loadable to allow direct internal/external conversions. These lines can be used as input/output connections to communicate with the controlling microinstruction program. These lines are also bidirectional. Three external lines are available which can be used to branch on condition. These three lines could be used as controller interrupt or priority control lines.

Figure 2:
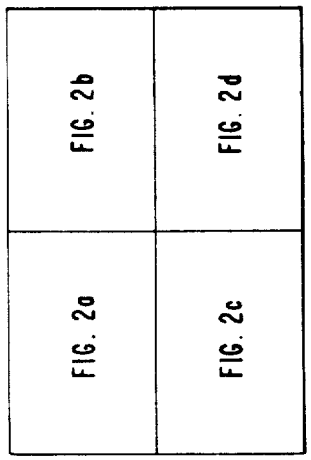
Figure 2D:
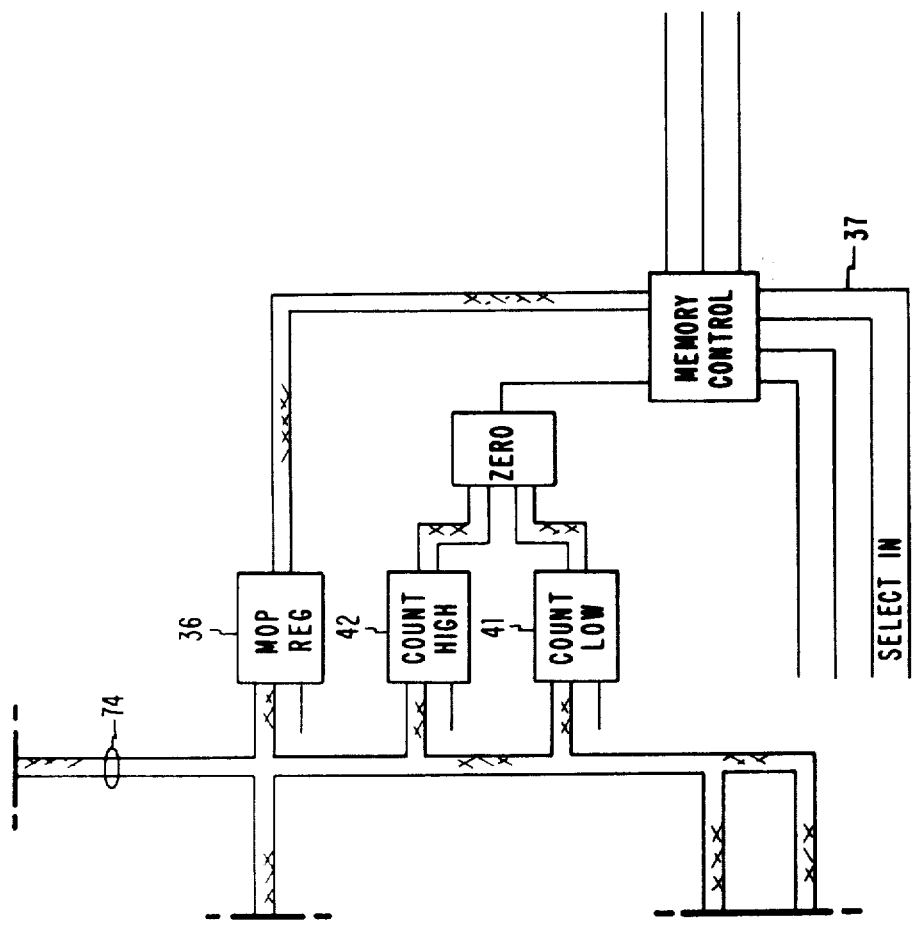
Figure 2A:
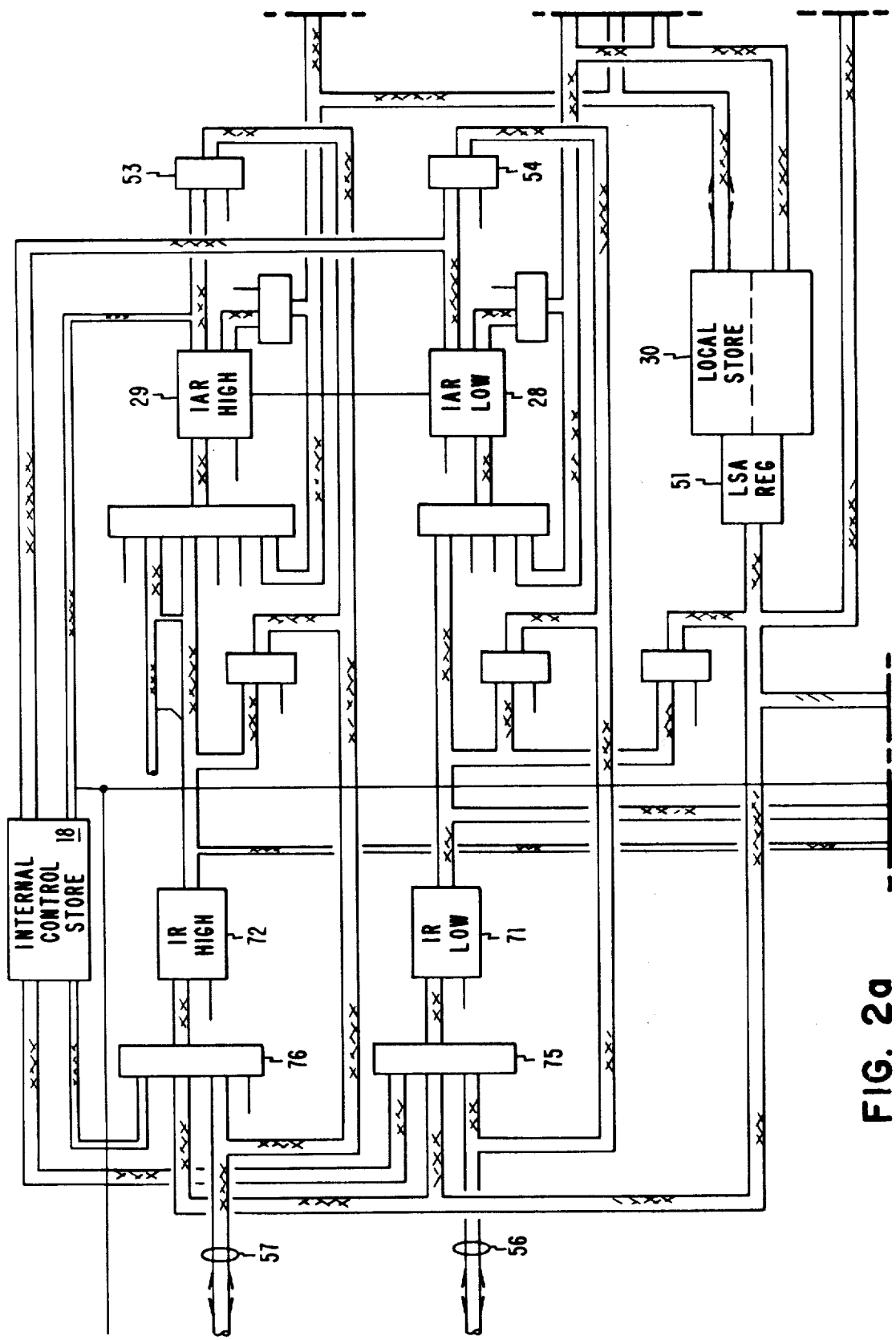
Figure 2C:
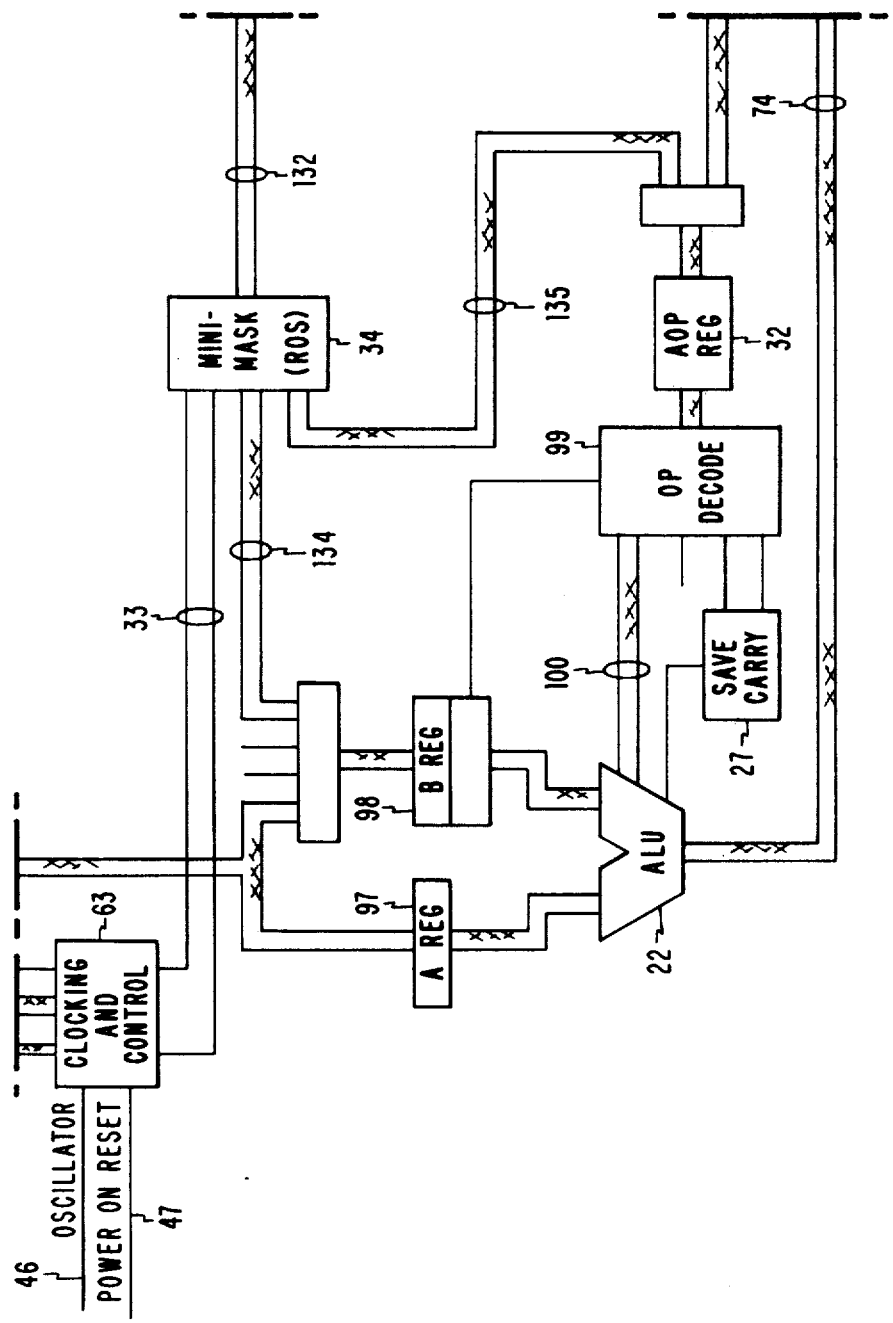

The internal control store and instruction addressing of block 24 of FIG. 1 appear on FIG. 2a. The processor is basically a 12 bit processor in that the fundamental operations of the device require a 12 bit instruction containing a 4 bit high order portion which specifies the type and length of the instruction, and an 8 bit low order portion containing modifiers, immediate data or addresses.

The control storage, whether internal, on-chip control store 18 or the external, off-chip control store 17 is addressed using a pair of 8 bit address registers, instruction address register (IAR high 29 and instruction address register (IAR) low 28 which are cooperating incrementing registers interconnected to permit the combination to function as a single 11 or 15 bit synchronous counter. The high order bit or bit 0 of IAR high 29 is used to control whether on-chip control store 18 or external control store 17 is addressed. When such bit position contains a logical 1, external control store is used by enabling gates 53 and 54 and when a logical 0 is contained in the bit position the internal control store 18 is addressed. When using internal control store 18, 11 bits of address are utilized to enable addressing of the 2,048 word addresses on the chip array. When addressing the supplemental control store, the full remaining 15 bits of the two registers are utilized to enable the addressing of an additional 32k or 32,768 word locations over data paths 56, 57.

Figure 3:
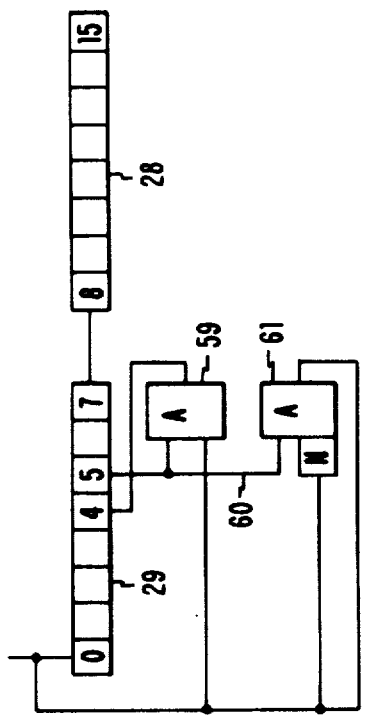
FIG. 3 is a partial logic diagram showing the circuitry of the instruction address registers of FIG. 2a which enables the use of various length instructions.

The variable address length of the on-chip and off-chip control storage is accommodated by modifying the carry circuit between bits 4 and 5 of IAR high 29 as shown in FIG. 3. When bit 0 contains a logic level 1 indicating that the external control store is being used, AND 59 is satisfied when the output of the bit 5 carry on line 60 is present causing a normal carry to bit position 4. When bit 0 contains a logic level 0, a carry from bit 5 on line 60 (indicating that the last addressed position in the on-chip control storage 18 has been accessed; causes AND 61 to be satisfied which loads bit 0 with a logic level 1 and places bits 1-15 at 0 logic levels for accessing the first address in the off-chip control storage. The all 0 condition occurs as bits 1-4 already contain 0 logic levels and upon the occasion of a carry from bit 5 all bit positions 5-15 are also at a 0 logic level.

Added flexibility is afforded to the control capability by providing a control store timing circuit and an off-chip change decode circuit which is addressed in parallel with the on-chip control store array.

Figure 4:
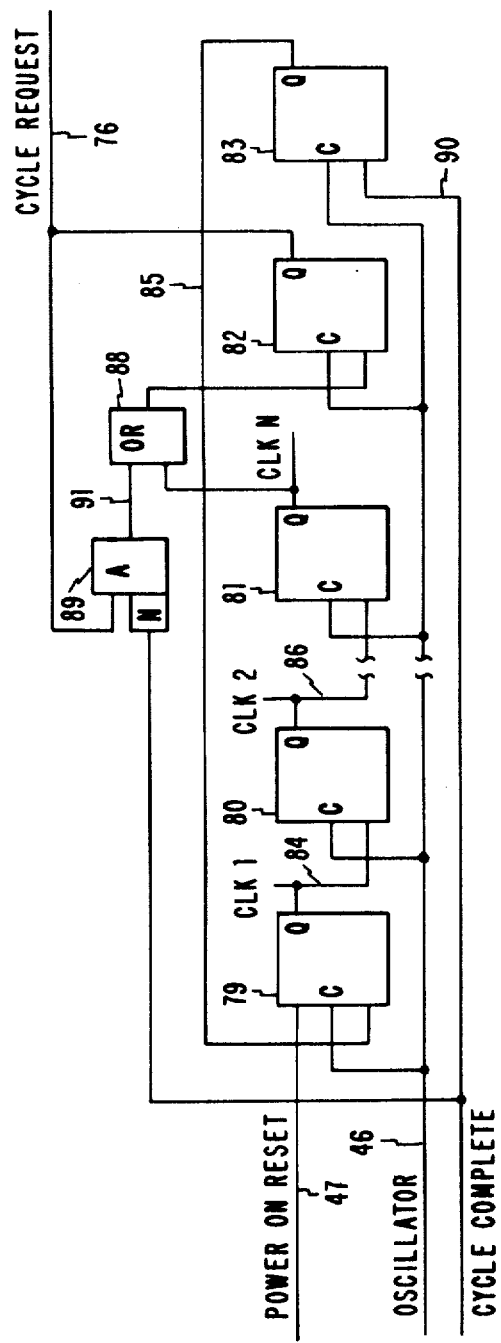
FIG. 4 is a portion of the logic of the clocking and control circuit of FIG. 2c which inhibits the clock upon a cycle request and terminates such inhibition upon cycle completion.

The control store timing circuit of FIG. 4 forms a part of the clocking and control circuitry that provides the processor clock times and also provides for the processor clock to be inhibited upon generation of a cycle request. Such clock inhibition is terminated upon receipt of a cycle complete signal. This technique makes the processor independent of the control store cycle times, which is important when both on-chip and off-chip control storage is used since off-chip control storage is usually slower than on-chip control store. In effect, this imparts a dynamic control that is independent of the speed variations experienced with the various storage devices.

Figure 5:
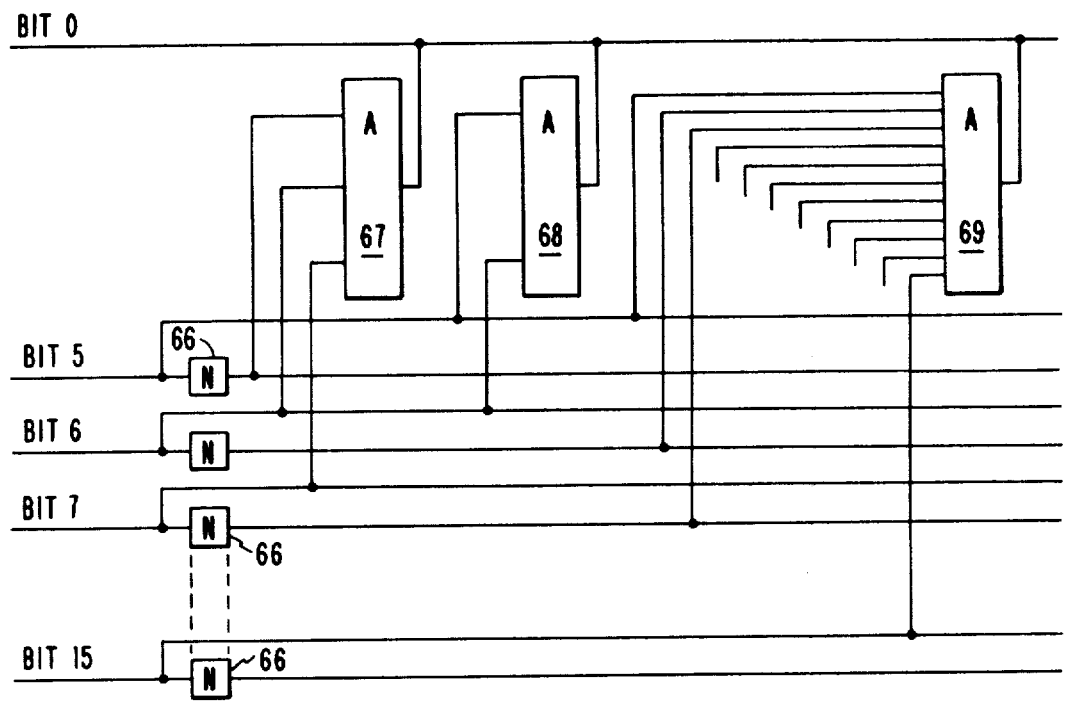
FIG. 5 illustrates the off-chip change circuitry that enables the internal control storage to be altered by substituting external control storage therefore.

The off-chip change circuit of FIG. 5 is used with read only on-chip control storage which cannot be altered except by replacement of the entire chip or the use of off-chip control store to the exclusion of on-chip control store. The logic condition of the instruction address registers 28 and 29 bit positions 5-15 is connected using true and complement lines illustrated as bit 5-15 with the complement of each generated by an inverter 66. During each access of control storage, if bit 0 has a logical 1, access is to the external control store. If bit 0 contains a logical 0, on-chip control storage will be addressed unless a change circuit AND block such as illustrated by AND's 67, 68 and 69 is satisfied. If a change circuit AND is satisfied, the output forces the bit 0 line to a logical 1 condition causing the address to be directed to the designated address in off-chip control storage. As illustrated, AND 67 being connected only to the three high order bits 5, 6 and 7 causes a group of 256 of the 2,048 instructions to be obtained from supplemental control storage rather than on-chip control store, while AND 68 connected only to high order bits 5 and 6 would substitute 512 consecutive instructions of the 2,048 normally addressed by the bits 5-15. If it is desired to substitute a single instruction an 11-way AND such as AND 69 is utilized to recognize a single 11 bit address combination. By adding AND circuits to recognize the desired address combinations, it is possible to selectively substitute supplemental control storage for that of the on-chip array.

Each sequential instruction is loaded into a pair of instruction registers (IR), IR low 71 and IR high 72. The instructions may be derived from the on-chip control storage 18 or the off-chip control storage 17. This selection is effected by gating circuit 76 for IR high 72 and gating circuit 75 for IR low 71. The content of the IR low 71 may be gated selectively to the IAR low 28, data bus 74, clocking and control circuit 63 or external control store bits 0-7 on data path 57. The contents of the IR high 72 is selectively gateable to the clocking and control circuitry 63, IAR high 29 or the external control store bits 8-15 on data path 56.

Since the external control storage interface on data paths 56 and 57 is 16 bits wide, the processor instruction registers 71 and 72 accept a 16 bit input for address purposes which is modified to accommodate the two address lengths. When a 15 bit address is to be used, the content of the IR high 72 and IR low 71 are respectively gated to IAR high 29 and IAR low 28. When, however, a 12 bit address is to be gated from the instruction registers to the instruction address registers, the content of IR high 72 bits 1-3 are respectively gated to IAR high 29 bit positions 5-7 whereupon bit 0 having a logic level of 0 causes bits 5-15 to be used to address on-chip storage 18 while bits 1-4 are not used. In this manner a concatenated address portion is generated in those circumstances where only 12 bits are utilized for addressing.

The cycle request to the control storage which inhibits processor clock action and the cycle complete restoration of the processor clock are effected by the processor clocking circuitry of FIG. 4 which forms a part of the logic contained in the clocking and control 63. During each instruction cycle a control store access is initiated. The instruction cycle is represented by clock cycles or clock times 1, 2, ... n of the figure wherein at clock n time, a cycle request on line 76 is generated. The clock cycle is initiated by the power on reset signal which presets d type flip-flop 79 to put a logical 1 on the output line 84 representative of clock 1. Since line 85 is down or has a logical 0, upon the occurrence of the next oscillator cycle on line 46, line 86 representative of clock 2 goes to a logical 1 as flip-flop 80 is set by the logical 1 signal on clock 1 line 84, and clock 1 line 84 goes to a 0 logic level. Each succeeding oscillator pulse sets the succeeding clock line and resets the flip-flop and clock line prior thereto until clock n becomes a logical 1 by setting flip-flop 81. The clock n output is directed to OR circuit 88 which is satisfied thereby and causes flip-flop 82 output line 76 to be set to a logical 1 condition by the next oscillator pulse. This line 76 generates a cycle request and satisfies AND 89 (cycle complete line 90 being at a logical 0 level) causing OR 88 to remain satisfied despite the termination of the clock n signal. Accordingly, flip-flop 82 remains set and holds the bit until a cycle complete signal on line 90 is also inverted to cause AND 89 to be unsatisfied and line 91 to go to a logical 0, whereupon the next oscillator pulse causes flip-flop 82 to terminate the cycle request and flip-flop 83 to have an output on line 85 which resumes the sequence whereby flip-flop 79 is turned on to generate another clock 1 signal. It will be appreciated that the n clock time may be any number, that the cycle request could occur at any intermediate position in the clock sequence or that a plurality of cycle request interruptions in the clock cycle could be provided.

The local store memory 20 of FIG. 1 includes the local store registers 30 and the local store address (LSA) register 51 of FIG. 2. The local store provides a working scratch pad memory that includes 64 8 bit registers. These registers may be used as 8 bit registers as when utilized in conjunction with the ALU 22, external or extension registers 93, 94 and 95 or memory control 24 or may be used in pairs as 16 bit registers as with the external memory 26.

The data flow block 23 of FIG. 1 includes as shown in FIG. 2 the clocking and control circuitry 63, the arithmetic and logic unit (ALU) 22 and various auxiliary devices and circuits that function with the ALU. The ALU is provided with input registers 97 and 98 with register 98 having the ability to provide either true or complement values of the register content.

In short word microprocessors ALU control bits become less available. To overcome this disability, an 8 bit ALU operation (AOP) register 32 is assigned to hold this information. This results in a saving of microcode bits as the microcode need only change the function of the ALU when such is required. Repeated operations may be executed by changing input data with the data gated to the data path 74 only when there is a storage command. The operation indicated in AOP 32 is decoded by operation decode circuitry 99 to produce an output on a series of 6 gate lines 100 which is transmitted to the ALU to control the operation thereof. The six gate lines 100 are conditioned in accordance with the table of FIG. 6 to provide an output which is either the same as the A or B registers 97, 98 or AND, OR, exclusive OR or ADD functions of the content of the input registers 97 and 98. The 1 and 0 indications in the table are the respective logic levels and the blanks represent don't care conditions.

Figure 7:
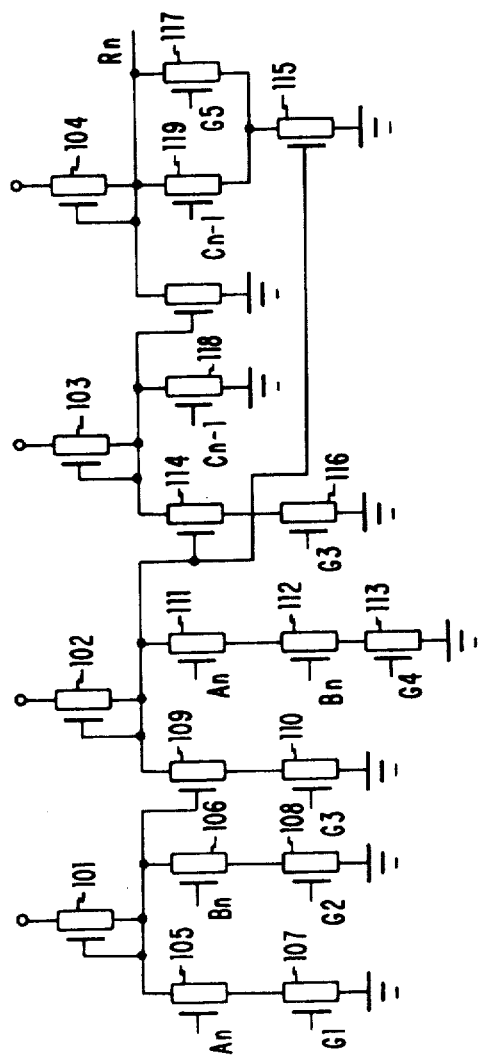
FIG. 7 shows the circuitry of one arithmetic and logic unit bit position.

FIG. 7 shows a schematic diagram of one bit position which receives an input from the corresponding respective bit position of each of the ALU input registers A and B. These inputs are respectively An and Bn. The bit position includes an adder circuit which includes a pair of series connected exclusive OR circuits with an output Rn and a carry circuit with an output Cn. The first exclusive OR circuit associated with load devices 101 and 102 and the second exclusive OR circuit is associated with load devices 103 and 104. The circuit associated with load device 101 includes field effect transistors (FET) devices 105, 106, 107 and 108. Inputs An and Bn are connected respectively to the gates of devices 105 and 106 and gate lines G1 and G2 are connected respectively to the gates of FET devices 107 and 108. The output of the circuit associated with load device 101 is connected to the gate of FET 109 associated with load device 102. Also associated with this load device are FET's 110, 111, 112 and 113. Input An is connected to the gate of device 111 and input Bn is connected to the gate of device 112 while gate lines G3 and G4 are respectively connected to the gates of devices 110 and 113. The output from the circuitry associated with load device 102 which is the output of the first of the series connected exclusive OR circuits is connected to the gate elements of FET's 114 and 115 associated with load devices 103 and 104 of the second exclusive OR circuit. Gate line 3 is also connected to the gate of device 116 and a gate line 5 is connected to the gate of FET 117. The carry signal of the next preceding bit position is connected to the gates of FET devices 118 and 119 and is identified as Cn-1. The output of the second exclusive OR circuit identified as Rn also constitutes the output line for this ALU bit position.

The corresponding bit position carry circuit is shown utilizing load devices 120 and 121 with the input An supplied to the gates of FET devices 122 and 124 and the input Bn supplied to the gates of FET devices 123 and 125 while the carry from the preceding bit position is supplied as an input to the gate of FET device 126 and labeled Cn-1. It will be recognized that the circuitry associated with load device 120 provides three AND circuits that combine to produce a down level on line 129 when an up level is to be found on any two of the inputs An, Bn and Cn-1. The output of the circuit associated with load device 120 is supplied to the gate of 127 associated with load device 121. Also associated with load device 121 is an FET device 128 which has a gate line G6 connected to the gate thereof. Whenever the gate line G6 is active the output Cn is at a down level and the carry function of the circuit is effectively removed.

Figure 6:
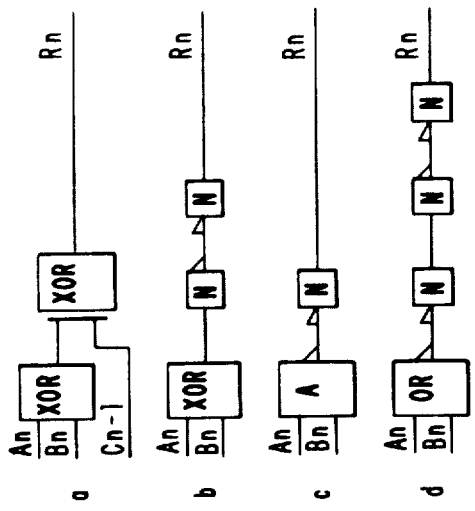
FIG. 6 is a truth table showing the condition of operation decode gate lines for effecting various identified functions.

As indicated in the table of FIG. 6, the ALU circuits can provide various functions by manipulating the states of gate control linesG1 through G6. With gates G1 through G4 active and gates G5 and G6 inactive the ALU bit position circuitry functions as an adder circuit with the first exclusive OR associated with load devices 101 and 102 receiving the respective bit position input signals An and Bn from registers A and B. The output of this exclusive OR is supplied as one of the inputs to the exclusive OR associated with load devices 103 and 104 while the other input thereto is the carry signal from the preceding bit position. By selectively activating the gate lines G1 through G6 as shown in the table, the carry circuit and various portions of the exclusive OR circuit can be deactivated to perform various other functions including the flushing of the content of the A or B registers through the ALU or conducting OR and/or exclusive OR functions with the content of the A and B input registers to the ALU. When the A register or the B register content is passed through the ALU the respective gate G1 or G2 is activated as are gates G3 and G6 while gates G4 and G5 are deactivated causing the circuits associated with load devices 101, 102, 103 and 104 to appear as a series of four inverters. In a similar manner the OR function is accomplished as the activation of the selected gate lines causes the circuitry associated with load device 101 to function as an OR invert followed by three inversion stages associated with load devices 102, 103 and 104. In performing the AND function the deactivation of gate line G3 and the activation of gate line G6 effectively removes the circuitry associated with load devices 101 and 103 from the circuit whereby the circuitry associated with load device 102 appears as an AND invert circuit followed by an inversion circuit associated with load device 104. When operating an exclusive OR mode, the exclusive OR circuit associated with load devices 101 and 102 operates as in the adder environment but the activation of gate line 6 causes the circuits associated with load devices 103 and 104 to function as a double inversion of the output of the exclusive OR circuit such that the output Rn is identical to the output of the exclusive OR circuit on line 1.

Figure 13:
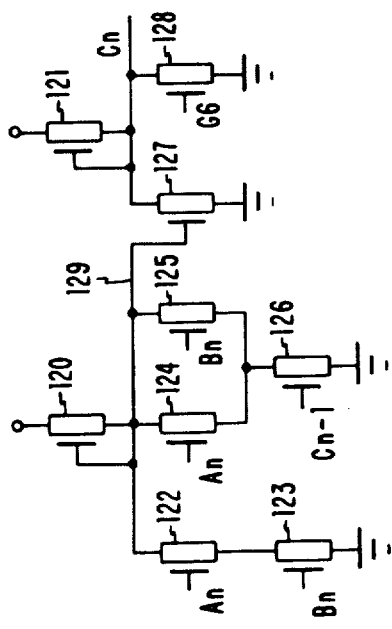
FIG. 13 illustrates the circuits effectively produced by applying the gate activation indicated in FIG. 6 to the circuitry of FIG. 7.

The effective result of the gate activation of the table of FIG. 6 as applied to the representative bit position circuit of FIG. 7 is illustrated in FIG. 13. FIG. 13a shows the adder circuit including two exclusive OR circuits with the An and Bn input values and the previous bit position carry, Cn-1 providing inputs to produce the adder output. FIG. 13b shows the same circuit wherein the disabling of the carry from the previous bit position causes the circuit to produce the output of the first exclusive OR of the An and Bn inputs, the remaining circuitry functioning merely as a double inversion. In FIG. 13c the AND function has been provided by the circuitry associated with load device 102, the circuitry associated with load devices 101 and 103 being effectively removed from the circuit by deactivating gate line G3. Load device 104 and its attendant circuitry functions as an inverter subsequent to the AND circuit function. To produce an OR function (FIG. 13d) of the inputs An and Bn, the selective gating causes the circuits associated with load devices 102, 103 and 104 to appear as a series of three inverters subsequent to the OR function of the stage associated with load device 101. As seen in FIGS. 13e and 13f, the An or Bn value may be gated through by activating gates G1 or G2 respectively while gates G3 and G6 are active causing the selected input to appear at the output while the four load devices and attendant circuits appear as a series of four inversion circuits in each instance.

The use of a mini-mask or read only storage (ROS) array 34 as an optional means of loading data to a plurality of registers and function control circuits simultaneously enables the processor to possess attributes of a long word microprocessor in selected circumstances. This read only storage is addressed by 5 bits on the data path 132 (which are bits 3-7 from data path 74) to enable 32 storage locations to be identified that are 18 bits wide. Each location in the ROS of mini-mask 34 provide 8 bits to the AOP register 32 on data path 135, 8 bits to input register 98 on data path 134 and 2 bits of function control information to the clocking and control circuits 63 on line 133. Accordingly this circuit compresses two instructions plus function control into a single instruction to thereby save both microcode and execution time in a short word processor.

Referring to FIGS. 8 and 9, the mini-mask 34 comprises the 5 line input data path 132 each of which data lines is connected to an inverter circuit 136 to produce a true output on line 137 and a complement on line 138. A series of 32 negative AND circuits 140 function to provide a decode of the various combinations of 5 bit input signals by possessing varying connections to the 10 true and complement lines of the input data path. A series of 18 collection NOR circuits 141 provide the 18 × 32 bit array of the ROS. The output of each negative AND circuit 140 is connected to the corresponding gate positions of each of the 18 NOR circuits 141. If a gate is installed, the output on the corresponding line 142 will be at a down or logical 1 level. If a gate is absent, the output on line 142 will be in an up or logical 0 level. The 18 output lines from NOR circuits 141 provide the data paths 133, 134 and 135.

Within the memory control of the processor the logic circuits that are intermediate line 144 entitled shift bit in and line 145 entitled shift bit out form one bit position of a free running ring counter. A bit is received on line 144 as a negative pulse which is inverted by inverter 146 to place a positive signal on line 147. Since line 148 is also positive except under circumstances where a bit is already in the bit position AND 149 is satisfied and a positive output on line 150 causes d type flip-flop 151 to be set producing a positive output on line 152 and a negative output on line 153. As long as flip-flop 151 is set the processor associated with this ring counter bit position has the bit and has access to the associated memory. If there is no request pending, the flip-flop 155 is not set and line 156 is positive, which since line 157 is also normally positive causes NAND 158 to be satisfied thereby generating a negative output on line 159 which causes negative AND 160 to be satisfied producing a positive output that sets flip-flop 161. With flip-flop 161 set line 162 is positive causing the output of inverter 164 on line 145 to go negative as the negative going portion of a minus pulse. The positive signal on line 162 also is directed to NOR 165 which becomes satisfied to produce a negative output on line 166 which clears flip-flop 151 causing the output on line 152 thereof to also be negative which clears flip-flop 161 causing line 162 to have a negative output which is inverted by inverter 164 to produce a positive output or the trailing edge of a negative going pulse on line 145 which effectively causes the bit to proceed to the next bit position in the ring counter associated with another controller which accesses the memory.

When a memory operation is called for, such a request may be initiated by any one of the three lines 168 which cause a positive output on line 169 which sets flip-flop 155. Flip-flop 155 is the memory request pending latch indicative of a pending request for access to the memory when set. With flip-flop 155 set the positive output on line 170 acting through negative AND 171 inhibits the processor clock until such time as a memory access has been completed and flip-flop 155 is reset. The minus output on line 156 prevents NAND 158 from being satisfied which effectively prevents the setting of flip-flop 161 to thereby hold the shift register bit at flip-flop 151 at the time it next circulates through this bit position of the ring counter until the memory access requested by this processor is complete. At the time the memory request latch 155 is set the same signal loads a count in the count registers 41, 42 indicative of the number of memory access cycles required. When the count reaches all zeros both negative ANDs 175 and 176 are satisfied providing positive outputs on lines 177 and 178 leading to NAND 179. A third input to NAND 179 is line 180 which can only be positive when there is a request pending and flip-flop 155 is set indicating that the select bit is resident in this bit position.

When next the select bit enters this ring counter bit position the negative pulse is inverted by the inverter 146 causing AND 149 to be satisfied which sets flip-flop 151. With flip-flop 151 set, the negative output on line 153 causes negative AND 181 to produce a positive output on line 180 which is inverted by inverter 182 to place a negative output on the request out line 148. Line 182 is held in an up condition unless used in a mode to be described hereafter. This negative request out signal on line 148 also disables AND 149 which effectively prevents a noise pulse from causing more than one bit to be recirculating in the ring. The positive signal on line 180 is also supplied as a positive signal on the third line leading to NAND 179 which enables AND 179 to have a negative output when both lines 177 and 178 are positive indicative of a zero count in register or counters 41, 42 when the required number of memory access cycles has been complete. When the memory access cycle is complete NAND 179 is satisfied producing a negative output which is inverted by inverter 186 to produce a positive output which permits satisfaction of NAND 185 causing a negative output on line 187 which both clears the memory operation register 36 and clears or resets the request pending latch 155. With the request pending latch 155 reset the output on line 156 goes positive causing negative AND 181 not to be satisfied which revokes the minus request out. With line 156 plus NAND 158 is no longer inhibited and a negative output on line 159 permits negative AND 160 to be satisfied with the positive output therefrom setting flip-flop 161. With flip-flop 161 set, flip-flop 151 is reset and the negative going pulse established on the shift bit out line 145 as previously in that the positive signal on line 162 is inverted to give a negative going pulse edge on the shift bit out line 145 whereupon satisfaction of NOR 165 causes a minus pulse on line 166 which clears or resets flip-flop 151 causing the output on line 152 to clear flip-flop 161 causing the negative signal on line 162 which is inverted by inverter 164 to cause the shift bit out line 145 to become positive creating the trailing edge of the negative going pulse.

Figure 10:
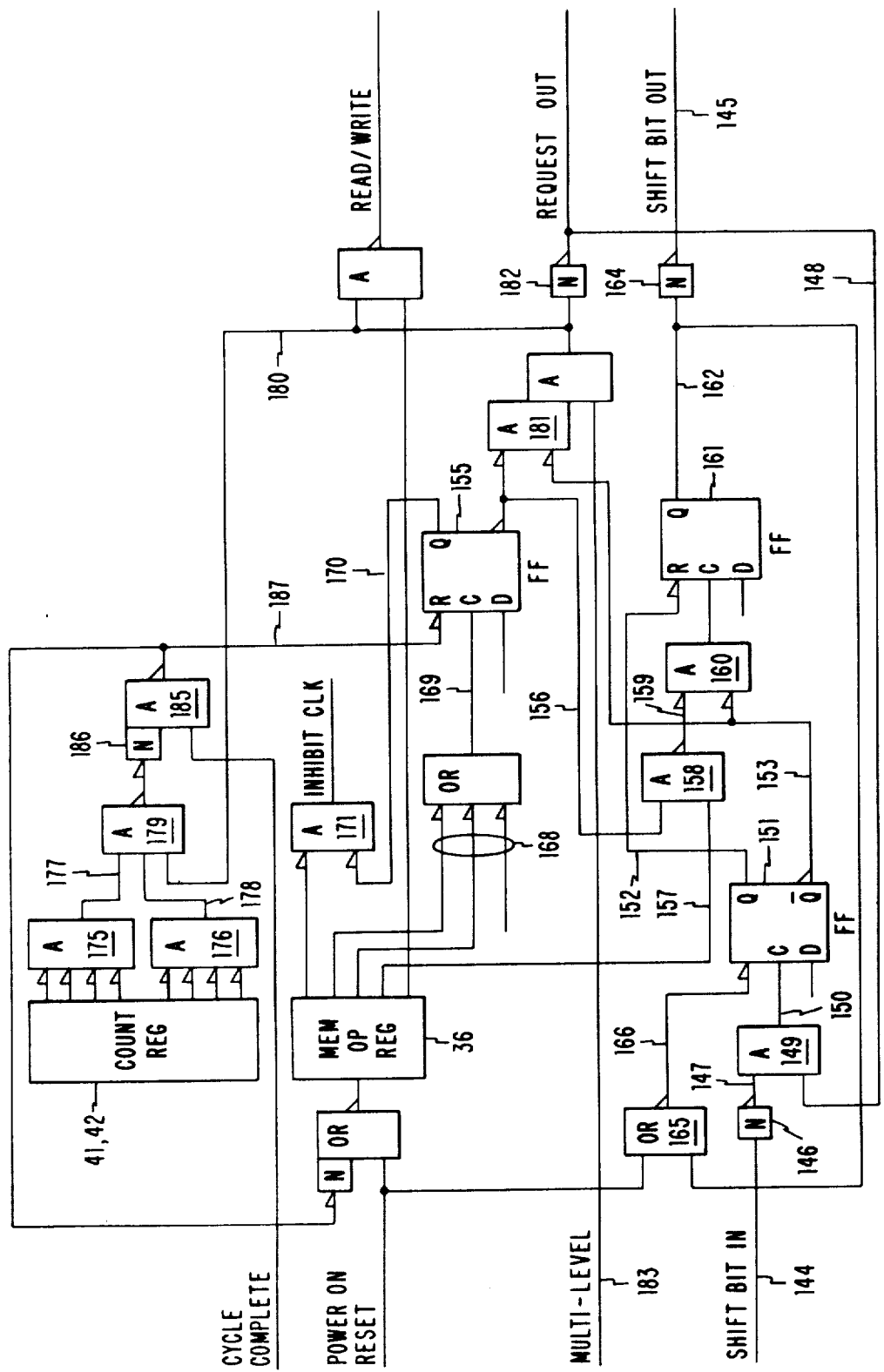
FIG. 10 is a logic diagram showing the operation of the memory control of FIG. 2d.

In FIG. 11 a series of processors 1, 2 and 3 are shown which access a common external memory 196. Each processor has a memory control (mc) circuit portion which includes the circuit of FIG. 10 and a series of line 197 interconnect the shift bit in and shift bit out lines of each of the processors such memory control circuits to form the previously reference free running ring counter. In this mode of operation the multilevel lines 183 (FIG. 10) of each of the three cooperating processors is tied to a common positive voltage to effectively remove such line from any control function. In this condition, the output of NOR 181 is effectively line 180 and each of the processors may access the external memory 198 when the memory control circuit associated therewith is retaining the single bit within the ring counter.

Multiple levels of memory access are illustrated in FIG. 12. The seven illustrated processors are partitioned into three separate rings by the lines 199. All seven of these processors could be given access to the memory sequentially on the same basis as in FIG. 11 using a single ring including all memory access shift register bit positions, but there is often a requirement that one or more of a group of processors be given a higher level of priority. FIG. 12 includes a second level ring counter 200 which is also a free running ring counter having a single bit which circulates through the bit positions numbered 1–4 and interconnected by line 201. The single bit is shifted continuously from one position to the next until retained by a bit position in response to a request for a memory cycle in the same manner as the circuit of FIG. 10, with the bit while in any of the four bit positions enabling the corresponding line 202. The bit within ring counter 200 enables the line 202 connected to the bit circuit at which the single bit of that ring counter is positioned. Each line 202 is connected to the multilevel lines 183 of the individual processor memory control circuits such that one processor level memory control ring is enabled by each bit position by enabling the multilevel lines 183 for that ring. It will be noted that the output lines from bit positions 1 and 3 of ring counter 200 are tied together which affords the ring composed of processors 1–3 enhanced priority with respect to accessing external memory 198. Accordingly, the use of a single ring as in FIG. 11 enhances the utilization of external memory by affording a dynamic accessing capability rather than fixed access periods or time slices. Adding a second level of access control such as that of FIG. 12 permits the assigning of accessing priority to external memory to a particular processor or group of processors or a varying gradation of priority with regard to selected processors or a group of processors. Other methods of controlling the multilevel lines 183 ranging from simple counters to intelligent control using a processor can be used to obtain different variation in processor priorities.

A memory control request out on line 148 enables gates 189 and 190 to transmit the content of the memory address registers 191 and 192 respectively on data paths 193 and 194 to the external memory. In response to this, address data is transmitted between the external memory and memory data register (MDR) 44 which provides the data interface between the processor and such external memory. Other communications between the processor and other devices is provided by external register 93, external register 94 and extension register 95.

While the invention has been particularly shown and described with reference to a preferred embodiment thereof, it will be understood by those skilled in the art that various changes in form and details may be made therein without departing from the spirit and scope of the invention.

What we claim is:

1. In a data processing system arithmetic and logic circuitry comprising
an arithmetic and logic unit (ALU) having first and second input registers;
said ALU having a series of bit positions equal in number to the width of the data path,
each said bit position including an adder circuit,
each said adder circuit including a series of gating means operable to selectively enable portions of said adder circuit; and
operation decode means having a series of output gate lines each interconnected with a corresponding gating means at each of said adder bit positions,
said operation decode means being operable to generate a plurality of signal combinations on said output gate lines enabling varying adder circuit portions to effect the performance of other functions by said adder circuits.

2. The data processing system arithmetic and logic circuitry of claim 1 wherein said adder circuits each comprise first and second exclusive OR circuits and a carry circuit,
the inputs of the first exclusive OR circuit comprises the corresponding bit positions of said first and second input registers, and
said second exclusive OR circuit has as inputs the output of said first exclusive OR circuit and the output of the carry circuit of another bit position.

3. The data processing system arithmetic and logic circuitry of claim 2 wherein said other functions include AND, OR, and exclusive OR functions.

4. The data processing system arithmetic and logic circuitry of claim 3 wherein said first exclusive OR circuit comprises
first and second load devices each coupling the drain voltage to an output node,
said first load device having first and second pairs of series connected field effect transistor (FET) devices interconnected between said output node and the source,
the corresponding first input register bit position and a first gate line being connected respectively to the gates of said first pair of series connected FET devices,
the corresponding second input register bit position and a second gate line being connected respectively to the gates of said second pair of series connected FET devices,
said second load device having a third pair of series connected FET devices and a group of three series connected FET devices connected between the output node thereof and the source,
said third pair of FET devices having the output node associated with said first load device and a third gate line respectively connected to the gates thereof, and
said group of three series connected FET devices having the respective bit positions of said first and second input registers and a fourth gate line respectively connected to the gates thereof.

5. The data processing system arithmetic and logic circuitry of claim 4 wherein said second exclusive OR circuit comprises
third and fourth load devices each coupling the drain voltage to an output node,
said third load device having a first FET and a fourth pair of series connected FET devices interconnected between said output node and the source,
said output node associated with said second load device and said third gate line being connected respectively to the gates of said fourth pair of series connected FET devices and the output of the carry circuit of another bit position being connected to the gate of said first FET device,
said fourth load device having a second FET device connected between said output node and the source and third and fourth FET devices connected to said output node with the source sides thereof gated to the source by a fifth FET device,
the gates of said second, third, fourth and fifth FET devices being respectively connected to the output node associated with said third load device, the said output of the carry circuit of said another bit position, a fifth gate line and the said output node associated with said second load device.

6. The data processing system arithmetic and logic circuitry of claim 5 wherein said carry circuit comprises an output node;
a sixth FET device interconnected between said carry circuit output node and the source; and a sixth gate line connected to the gate of said sixth FET device for selectively disabling the output of said carry circuit.

7. In a data processing system arithmetic and logic circuitry comprising
   a first exclusive OR circuit including first and second load devices;
   a second exclusive OR circuit including third and fourth load devices;
   first and second inputs connected to said first exclusive OR circuit;
   third and fourth inputs connected to said second exclusive OR circuit, said third input being the output of said first exclusive OR circuit and said fourth input being a carry from a previous adder stage; and
   first gating means selectively operable to inhibit said fourth input, whereby the output of said second exclusive OR becomes identical to the output of said first exclusive OR.

8. The data processing system arithmetic and logic circuitry of claim 7 wherein
   said first exclusive OR includes an OR function having said first and second inputs connected to the input thereof and an AND function having said first and second inputs connected to the input thereof; and
   said circuitry further comprises second gating means for disabling said OR function, whereby the output of said second exclusive OR circuit becomes the output of said first exclusive OR AND function.

9. The data processing system arithmetic and logic circuitry of claim 7 wherein
   said first exclusive OR includes an OR function having said first and second inputs connected to the input thereof and an AND function having said first and second inputs connected to the input thereof; and
   said circuitry further comprises third gating means for disabling said AND function whereby the output of said second exclusive OR circuit becomes the output of said first exclusive OR OR function.

10. The data processing system arithmetic and logic circuitry of claim 9 wherein said circuitry contains a number of bit positions equivalent in number to the data path associated therewith and each such bit position includes said first and second exclusive OR circuits, and said first, second and third gating means.

* * * * *